United States Patent [19]
Kayama et al.

[11] Patent Number: 5,197,129
[45] Date of Patent: Mar. 23, 1993

[54] INPUT/OUTPUT DEVICE AND A CONTROL SYSTEM INCORPORATING SUCH A DEVICE

[75] Inventors: Masahiro Kayama; Yasuo Morooka, both of Hitachi; Takayuki Oshiga, Narashino; Katsuhiro Fujiwara, Sakura, all of Japan

[73] Assignee: Hitachi, Ltd., Tokyo, Japan

[21] Appl. No.: 573,772

[22] Filed: Aug. 28, 1990

[30] Foreign Application Priority Data

Sep. 14, 1989 [JP] Japan ................... 1-237251

[51] Int. Cl.⁵ .................................. G06F 13/00
[52] U.S. Cl. ............................. 395/275; 395/250
[58] Field of Search ........... 364/200, 900; 395/250, 395/275

[56] References Cited

U.S. PATENT DOCUMENTS

| | | | |
|---|---|---|---|
| 4,583,219 | 4/1986 | Riddle | 370/60 |
| 4,642,758 | 2/1987 | Teng | 364/200 |
| 4,853,872 | 8/1989 | Shimoi | 364/200 |
| 4,901,231 | 2/1990 | Bishop et al. | 364/200 |

*Primary Examiner*—Dale M. Shaw
*Assistant Examiner*—Diane E. Smith
*Attorney, Agent, or Firm*—Antonelli, Terry, Stout & Kraus

[57] ABSTRACT

An input/output device has a processor which processes data strings received by the device. When a data string is received, it is passed to a serial interface and a timing means. The serial interface generates a signal which interrupts the existing processing by the processor and causes the process to start processing of the newly received data string. At the same time the timing means measures the length of the data string and compares it with a predetermined length set by user-controllable data setting means. If the data string length reaches the predetermined length, the processor is triggered to stop processing the new data string and to recommence the processing it was performing prior to interruption. The unprocessed part of the new data string is stored in a memory.

In this way, urgent data strings, which are generally short, are processed rapidly and longer data strings are processed after the urgent data strings. It is not necessary for the data string to contain any information to identify its length.

32 Claims, 6 Drawing Sheets

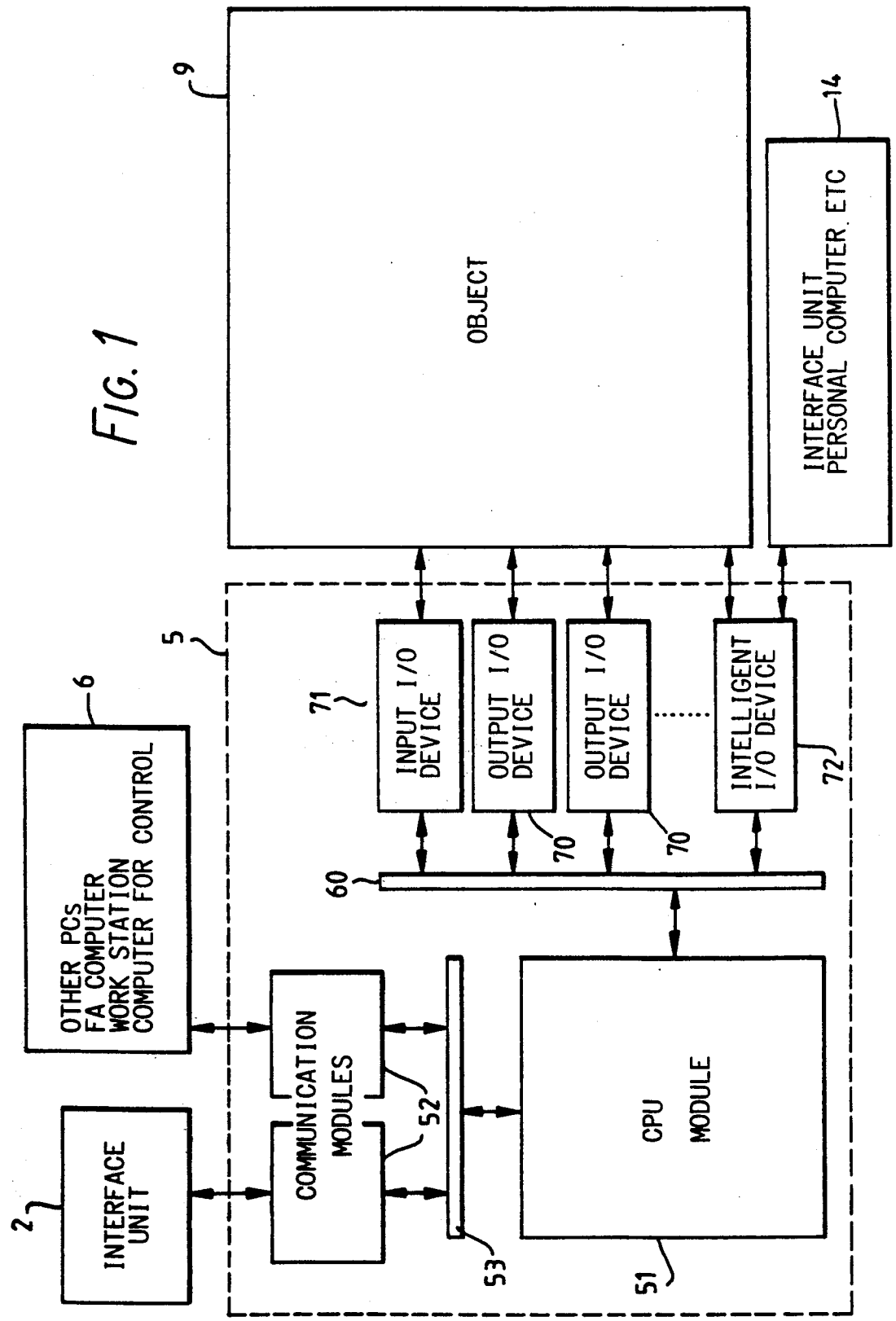

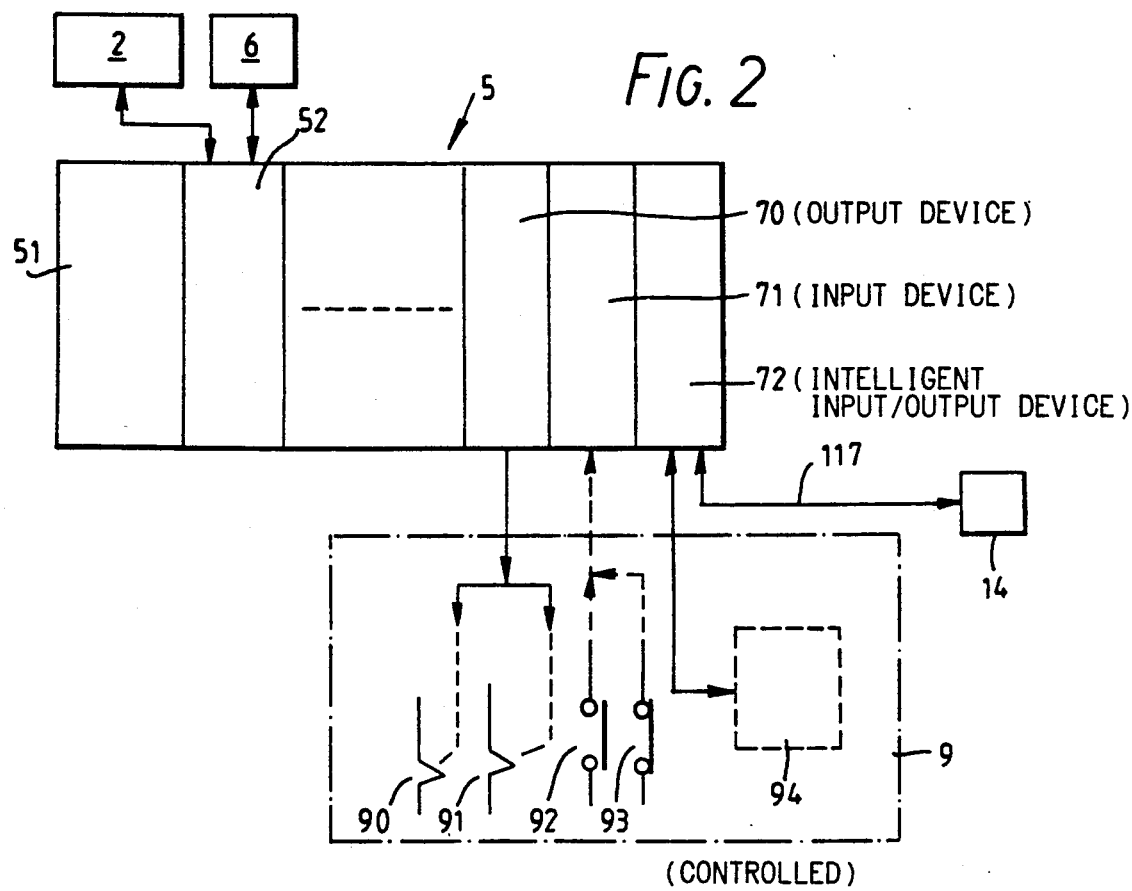
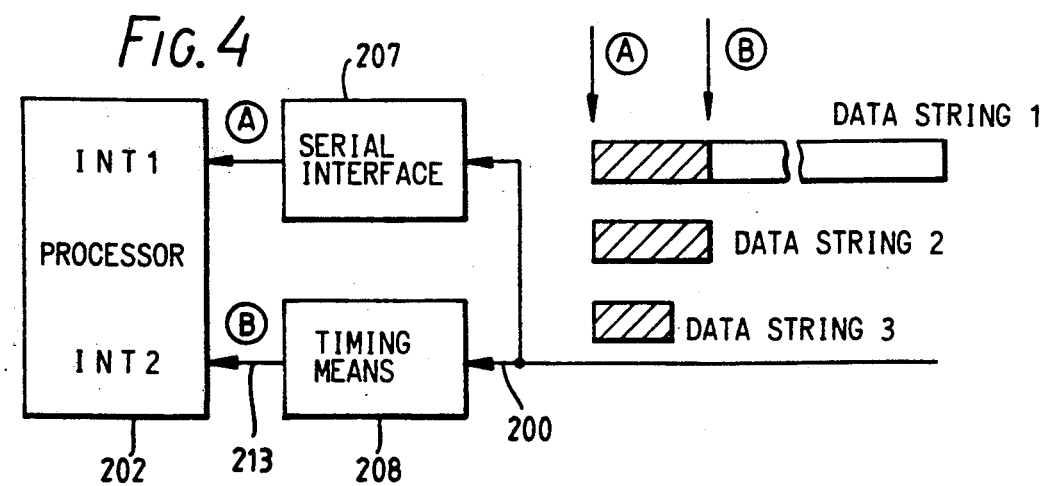

INPUT/OUTPUT DEVICE AND A CONTROL SYSTEM INCORPORATING SUCH A DEVICE

BACKGROUND OF THE INVENTION

1. Field of the Invention

The present invention relates to an input/output device. It also relates to a method of operating such a device, and to a control system incorporating such a device.

2. Summary of the Prior Art

It is well known to control an object, such as an industrial system or plant, using a programmable controller. That programmable controller has a processing module and one or more input/output devices, which input/output devices link the processing module to the object to be controlled. Data from the object are transmitted via one or more of the input/output devices to the processing module, and the processing module may also transmit data to the object to be controlled via one or more other input/output devices.

An example of such a known controller is the H-2000 Programmable Controller from Hitachi, Ltd.

When originally developed, such input/output devices were controlled entirely from the processing module of the programmable controller. However, it has been proposed that at least some of the control of the input/output device be achieved via a processing means within the input/output device itself. Such an input/output device is then called an "intelligent" input/output device. The processor of an intelligent input/output device is arranged to carry out at least some processing functions on the data that the input/output device receives.

In existing arrangements, the data from an object is passed to the input/output device in a series of frames, with each frame corresponding to a string of data, and the string of data must then be processed by the processor of the input/output device. One example of the type of frame which can be used is disclosed in e.g. the article entitled The Hierarchy of Communication Networks in the Programmable Assembly Cell: and Experimental Framework" by L. Sintonen and T. Virvalo in IEEE Network of May 1988, Volume 2, No. 3, pages 48 to 52.

SUMMARY OF THE INVENTION

In general, it is desired that an intelligent input/output device be capable of:

1. carrying out part of the necessary processing of data to be processed by the programmable controller, in addition to the input/output function of transmitting and receiving data; and 2. being able to control communications within the programmable controller, particularly for data which is transmitted and/or received with high frequency.

Thus, there is a need for the intelligent input/output device to be able to process rapidly and efficiently the data which it receives in the form of data strings.

However, the input/output device will normally be expected to process and transmit a wide range of data. Such data may be exemplified by:

(a) contact data, which includes bit data outputted to a relay in the object to be controlled, and such contact data typically has a short bit length and has to be processed at high speed (10-20 ms);

(b) control command data; the system may involve many control commands, such as e.g. servo position, which have a short bit length (1-4 bytes) and have to be processed at high speed (1-10 ms);

(c) process data, which includes data relating to temperature, pressure, etc. of the object and is short to medium in length (one byte to several tens of bytes) and needs to be processed at medium speed (100 ms to 1 s);

(d) program data, which relates to the operation of the program or equivalent data, and which takes the form of medium to long statements (several tens of bytes to several kilobytes) requiring a low speed response (1 s to 10 s);

(e) control data, which includes e.g. the status data of the object to be controlled and typically has a short length (one bit to several bytes) and needs to be processed at medium speed (about 1s);

(f) diagnostic data, which includes e.g. stop commands to equipment having a short statement length (one bit to several bytes) and must be processed at high speed;

(g) alarm data, including data necessary to issue stop demands to equipment of the object to be controlled and alarm data typically represented by short statements (one bit to several bytes) requiring a very high speed response.

Thus, some data needs to be processed at different speeds than other data, and the priority of processing of the data may depend on the nature of that data. Thus, for example, alarm data must be processed as soon as it is received. Therefore, an intelligent input/output device must be able to control the processing of data strings which it receives so that there is no significant delay in the onward transmission to the processing module of data which needs to be processed rapidly.

Consider now the case where the processor of the input/output device is processing data which it has received earlier. Then, the input/output device receives new data, and it is necessary for the input/output device to determine whether that new data needs to be processed more rapidly than the data it is already processing. To do this, the processing being carried out by the processor is interrupted until the relative importance of the new data is assessed.

In the article by Sintonen and Virvalo mentioned above, each data string contains, at or close to the start thereof, control data which defines the length of the data string. Therefore, if such a data string is received by the input/output device, the content of the control data may be assessed to determine whether the new data should be processed immediately, or whether the processing of data already received may continue.

However, there is then a problem. For all data strings, irrespective of whether they have a high priority or a low priority, the control data must be processed. In the case of some of the data types defined above, the control data will then be longer than the data itself (for example, alarm data and diagnostic data, requiring very rapid processing, may be as short as one bit). Therefore, it has been appreciated that the existing system effectively slows the processing of the most urgent data, because of the need to process the control data.

The inventors of the present invention have appreciated that, in general, data strings which need to be processed rapidly are normally short, and data strings which are long generally have a low priority. Therefore, the present invention proposes that a predetermined data string length is defined, and the length of each data string is compared with that predetermined length, with data strings longer or shorter than that predetermined length being processed differently.

The operation of an input/output device according to the present invention may be viewed in two ways, namely from the point of view of the processor of that device, and from the point of view of a data string received by that device. From the point of view of the processor, the processor is interrupted whenever a data string is received, but is permitted to resume its existing processing if the data string is at least as long as the predetermined length. However, if the data string is less than the predetermined length, the processor must immediately receive and process that data string. From the point of view of the data string, if it is shorter than the predetermined length it is immediately processed, whereas if it is longer than the predetermined length, its processing will be deferred.

It would be possible for the processor to entirely stop processing until the length of the data string had been determined. However, such an arrangement is inefficient, and therefore it is preferable that the processor immediately starts processing any new data string it receives, until it has been determined that that data string is at least as long as the predetermined length. If it is then longer than the predetermined length, the part of the data string already processed may be stored within the processor itself, while parts not yet processed may be transmitted to a memory of the input/output device for processing when the processor has processed all urgent data that it has received. In such an arrangement, the data within a data string which is longer than the predetermined length must be arranged so that that part of the data string which is shorter than the predetermined length is capable of being processed independently of the rest of the data string, and therefore it may sometimes be necessary to include dummy bits within that part of the data string which is shorter than the predetermined length, to ensure that satisfactory processing is achieved.

It is furthermore possible for the manufacturer of the input/output device to pre-set the predetermined length which the input/output device uses. However, it can be appreciated that the optimum length of the predetermined length may vary depending on the type of data that the input/output device is to handle. For example, it was mentioned above that alarm data may be several bytes long. It is important that all such alarm data is immediately processed, and therefore, if a system is modified so that the length of the alarm data is increased, it is important to be able to increase the predetermined length set within the input/output device. Therefore, it is preferable that there is user operable means to permit that predetermined length to be set in accordance with the wishes of the user, i.e. varied depending on the requirements of the situation.

The present invention relates to both device and method aspects of the invention, and also relates to a control system incorporating such a device.

Such a control system may then control an object, with the input/output device being incorporated within a programmable controller. It can then be appreciated that, in such a system, one or more of the input/output devices according to the present invention may be used to transmit data from the object to the processing module of the programmable controller, and other input/output devices used to transmit data from the processing module to the object to be controlled. Of course, not every input/output device of such a programmable controller needs to be intelligent, and such a programmable controller may incorporate one or more standard input/output devices in addition to one or more input/output devices incorporating the present invention.

It can thus be seen that the present invention proposes that the priority given to a data string depends on its length, rather than on control data within that data string. Therefore, the processing is determined by the length of the information data, i.e. the data relating to the state of the object or to the information from the processing module. In the existing systems, the control data gives information about the data string itself.

BRIEF DESCRIPTION OF THE DRAWINGS

Embodiments of the present invention will now be described in detail, by way of example, with reference to the accompanying drawings in which:

FIG. 1 shows a block diagram of a control system incorporating an input/output device according to the present invention;

FIG. 2 corresponds to FIG. 1, but with the object to be controlled shown in more detail;

FIG. 4 is a schematic diagram useful in understanding the operation of the present invention.

FIGS. 5a–5d, shows different data strings which may be received by the input/output device of FIG. 4;

DETAILED DESCRIPTION

Figure 3:
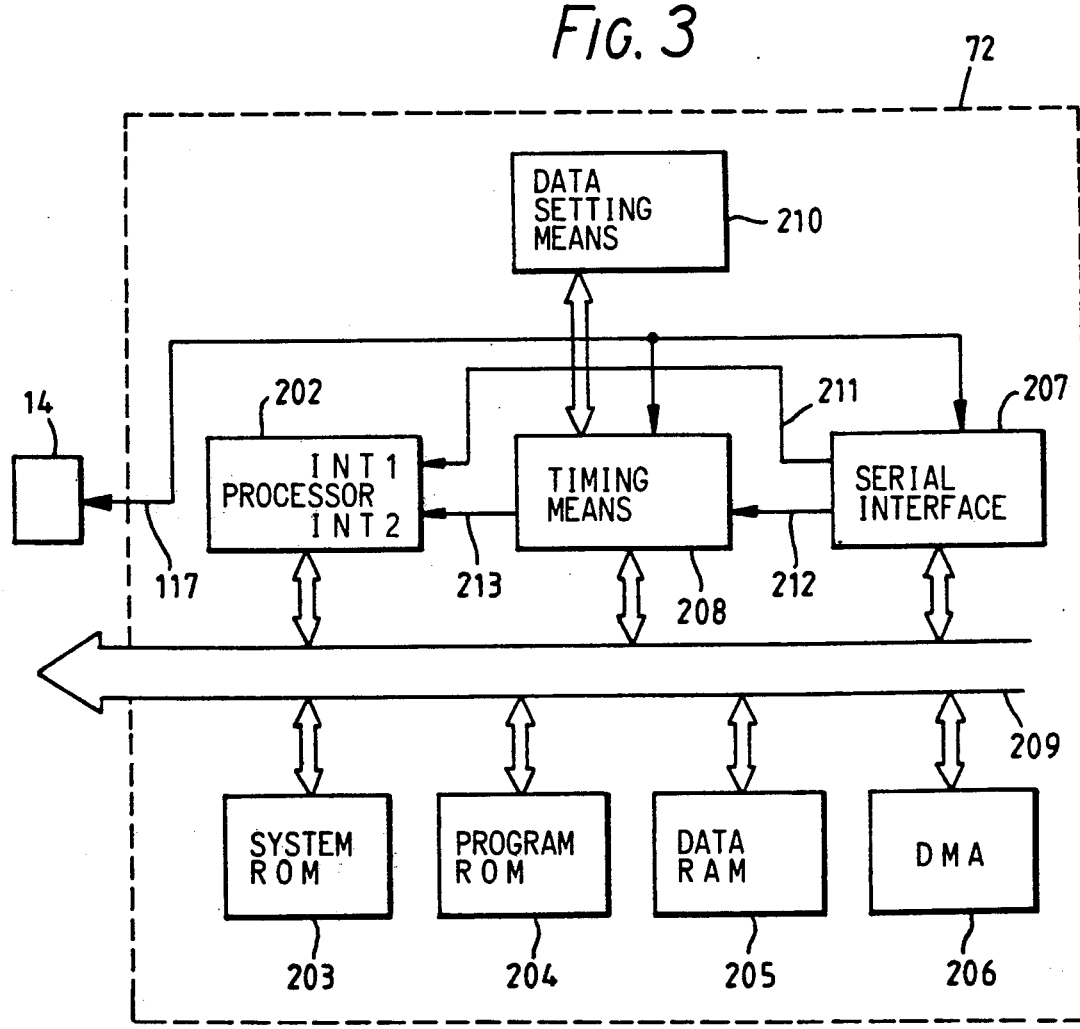
FIG. 3 is a schematic diagram showing in more detail the structure of the input/output device according to the present invention.

FIG. 1 is a block diagram of a control system which may incorporate the present invention.

In FIG. 1, a programmer interface 2 connects the user to a programmable controller 5, which programmable controller 5 may be connected to other external systems 6 in a manner that will be described later, and also to an object 9 which is the object to be controlled. Within the programmable controller 5 is a processing module (CPU module) 51 which is connected to communication modules 52 via a bus 53. The communication modules 52 permit the CPU module 51 to communicate with the user via the programmer interface 2 and with the external units 6. A further bus 60 connects the CPU 2 module 51 to input/output devices 70, 71, 72. Some of those input/output devices 70 may be arranged to act as output devices, to pass data from the CPU module 51 via the bus 60 to the object 9. Others of those input/output devices (e.g. those indicated by reference numeral 71) may be input devices for receiving data from the object 9 and passing it via the bus 60 to the CPU module 51.

The input/output devices 70, 71 may be conventional, but the present invention proposes that the programmable controller 5 also has at least one, preferably more, intelligent input/output devices 72. As illustrated in FIG. 1, such an intelligent input/output device 72 may also be connected to the object 9 (to act as an input or as an output device) and also may be connected to a suitable interface, personal computer, etc. 14. The structure and operation of an intelligent input/output device 72 according to the present invention will be discussed later.

The CPU module 51 carries out various functions which are necessary for the programmable controller 5. For example, the CPU module 51 may:

1. Execute sequence control operations;
2. Control other parts of the programmable controller 5;
3. Process input and output data from and to the object 9 via the input/output devices 70, 71, 72;
4. To receive a suitable program inputted from a user via the interface 2, to transmit data to the user via that interface 2.
5. To receive and/or transmit data to other external units 6.

In general, the object 9 may be any system that needs to be controlled by the programmable controller 5. FIG. 2 shows an example corresponding to FIG. 1, in which the object 9 to be controlled comprises a pair of relays 90 and 91, a pair of contacts 92 and 93, and other equipment 94 to be controlled. The output device 70 transmits control commands from the CPU module 52 to the relays 90, 91 to determine whether or not those relays are to be closed or not. The input devices 71 receive data from the contacts 92, 93 (to indicate whether the relays 92, 93 are open or closed) and on the basis of this, input/output commands are transmitted by the intelligent input/output device 72 to the equipment 94. FIG. 2 also indicates a line 117 linking the intelligent input/output device to the interface, personal computer, etc. 14.

The intelligent input/output device 72 in FIG. 1 is illustrated in more detail in FIG. 3. A processor 202 operates according to the content of a system ROM 203 and executes a control program stored in a program RAM 204. When executing such a program, the processor reads out and updates the contents of a data RAM 205, if required. A Dynamic Memory Access Controller (DMAC) 206 controls transmission of data through a bus 209 in place of the processor 202. The bus 209 not only serves as a data transmission line connecting various components of the system, but also is connected to buses of other parts of the programmable controller 5 through appropriate interfaces. Serial interface (I/F) 207 performs data transmission with external units 14, which may include an interface, or other unit through a serial transmission line (e.g. RS-232C) 117. External interrupt terminals INTs 1 and 2 are provided on the processor 202 and the processing carried out in the processor 202 is interrupted on the basis of signals supplied to those terminals. The INT 1 receives a signal from the serial I/F 207 informing the processor 202 that receipt of a data string has occurred. On the other hand, the terminal INT 2 receives a signal indicating process change-over timing generated by a timing means 208 to be described later. When external data is transmitted through the serial transmission line 117, the serial I/F 207 informs the processor 202 through the signal line 211 that receipt of a data string has commenced. The processor 202 receives this information as an interrupt signal at the terminal INT 1. The transmission line may be a parallel line such as GPIB. In this case, the interface 207 is a parallel I/F.

FIG. 4 illustrates the principle of the present invention. Consider a data string input on a line 200 to both the serial interface 207 and the timing means 208. It can be noted that the line 200 may represent a line of the bus 209 from the object to be controlled, a line of the bus 209 from the CPU module, or a line from the external interface 14 to the intelligent input/output device 72.

The leading edge of the data string, marked (A) is detected by the serial interface 207 which generates a signal on line 211 to the terminal INT 1 of the processor 202, which interrupts the processing currently being carried out by the processor 202 and preferably causes the processor 202 to begin processing the new data string. Suppose now that the data string is relatively long, as shown by data string 1 in FIG. 4. The timing means 208 has stored within it data indicating a predetermined length, and when it is detected by the timing means 208 that the data string 1 is at least as long as this predetermined length (i.e. the point (B) has been reached in the data string 1), the timing means 208 generates a signal on line 213 to the terminal INT 2 of the processor 202, which causes the processor 202 to resume the processing that it was carrying out prior to the arrival of the data string 1. The leading part, i.e. from (A) to (B) of data string 1 will already have been processed by the processor 202, but the rest of the data string 1 may be transmitted from the timing means 208 to the data RAM 205 in FIG. 3, where it can be stored for subsequent retrieval at a time when the processor 202 has completed processing of more urgent data strings. For a data string 2 or a data string 3 in FIG. 4, whose lengths are the same as or shorter than the predetermined length set in the timing means 208, the processor 202 completes the processing of such data strings before the time (B) is reached, and so such data strings are processed immediately on receipt.

Figure 5:
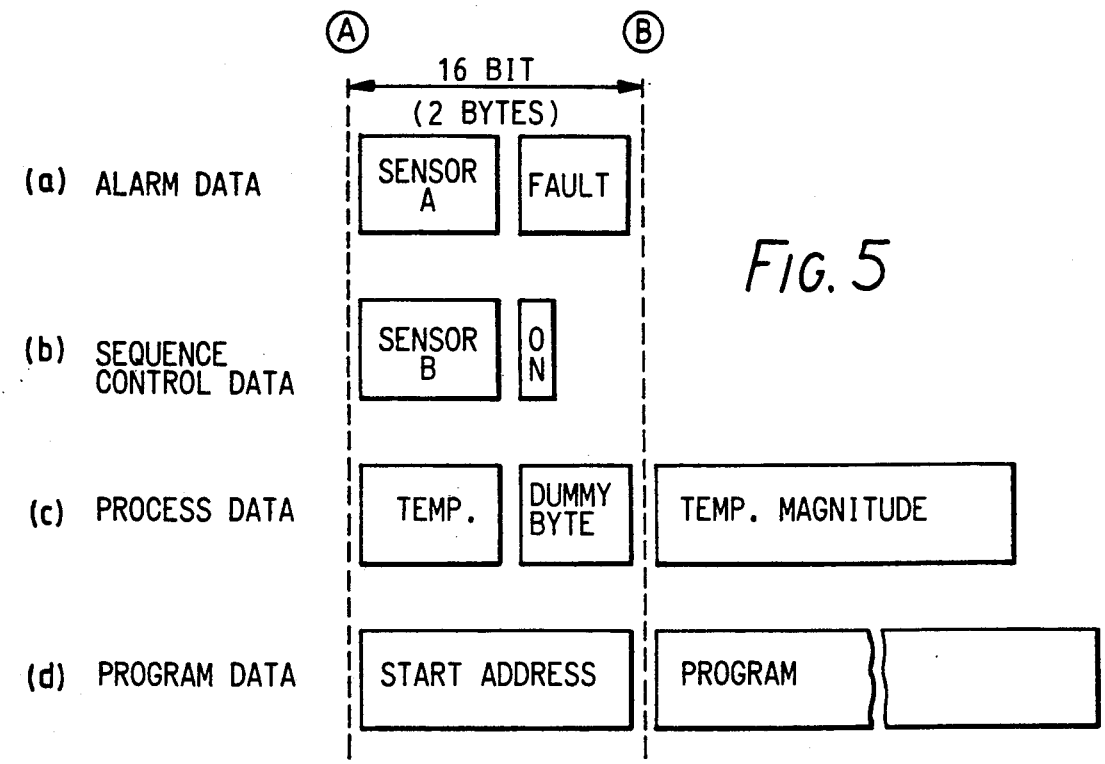
FIG. 5, comprising

FIG. 5 shows examples of data strings to be processed in this way, assuming that the time interval (A) to (B) is sixteen bits (two bytes).

FIG. 5(a) shows alarm data, and it can be seen that this data contains two bytes, the first byte identifying the origin of the alarm data, e.g. identifying that it comes from sensor A and a second byte defining the fault. Since this alarm data does not exceed the predetermined length, it is processed immediately by the processor. The same is true of the sequence data shown in FIG. 5(b), which consists of a one byte part identifying the origin of the data (e.g. data from sensor B) and a single bit identifying the status of that sensor.

FIG. 5(c) shows a data string of process data, which is longer than the two byte interval between (A) and (B). Normally, such process data could contain a first byte identifying the type of data, e.g. temperature, and a series of further bytes identifying the magnitude of that data. However, it must be remembered that the processor 202 will process immediately that part of the data string between A and B, and therefore it is preferable that a dummy byte is inserted between the byte identifying the type of data e.g. temperature, and the rest of the data string, so that the processor identifies that the process data relates to temperature, and the subsequent magnitude is stored.

Finally, FIG. 5(d) shows a data string representing a program to be loaded. Then, the first two bytes of the data string may represent a start address, so that the processor 202 processes that start address between the time (A) and (B), with the subsequent parts of the program being stored in the RAM 205 for subsequent processing.

Figure 6:
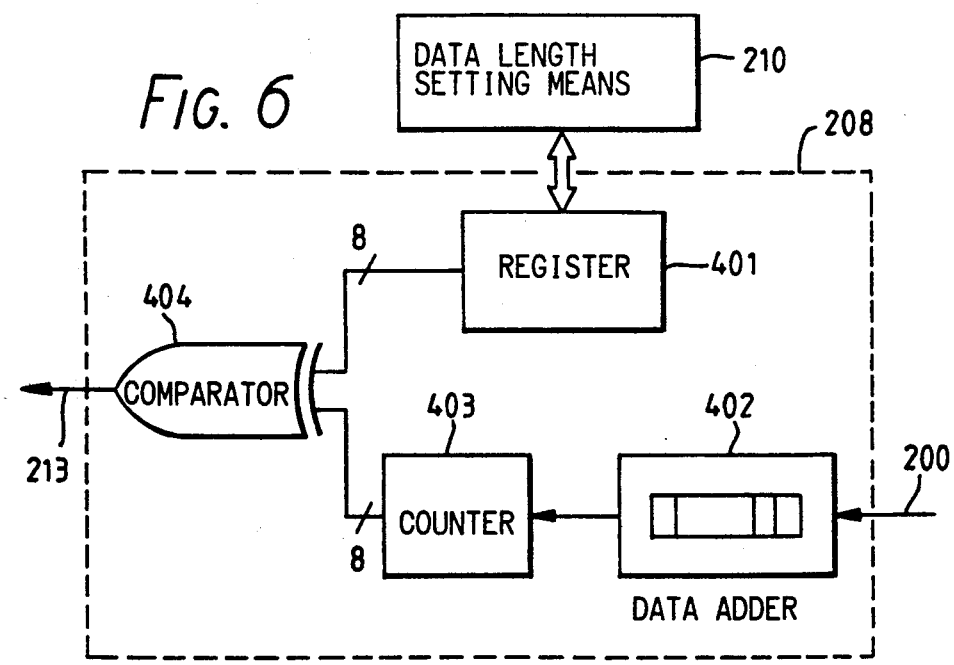
FIG. 6 shows in more detail the structure of the timing means of FIG. 3.

FIG. 6 shows in more detail the structure of the timing means 208. The timing means 208 has a register 401 which is set to the predetermined length of the data string, i.e. the time from (A) to (B) in FIG. 4. The length of this predetermined length may be adjusted by user operable data length setting means 210, which can vary the contents of the register 401.

When a data string is received on line 200 by the timing means 208, a data adder 402 counts the bits of the data string and whenever a predetermined bit count (e.g. one byte) of data has been received, a signal is sent to a counter 403 which then sends its count value to a comparator 404, which compares that with the predetermined length (expressed in terms of bytes) from the register 401. When the two values are the same, a signal is sent on line 203 to the processor 202, which releases the interrupt of the processor 202.

Figure 7:
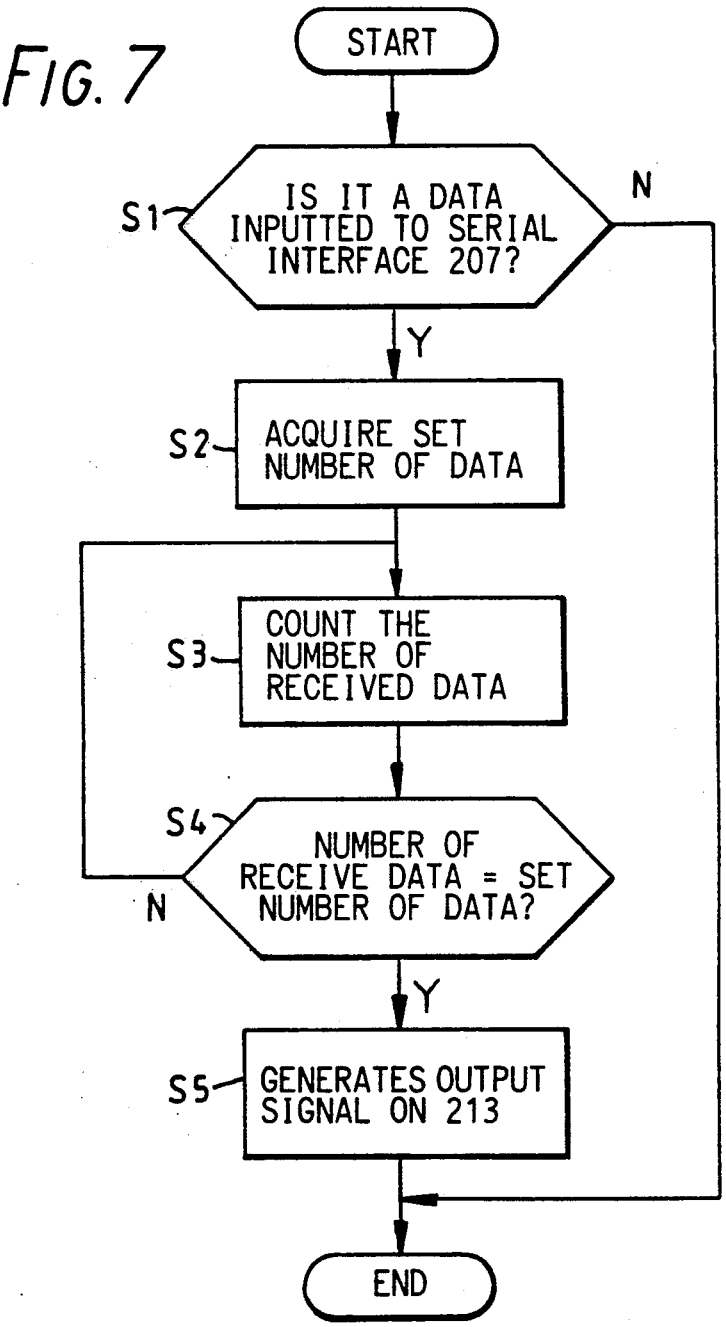
FIG. 7 shows process steps in the operation of the timing device of FIG. 6.

The operation of the timing means 208 can be seen from the flow chart of FIG. 7, and it can be seen that processing commences when data input from a signal line 200 is received by the serial interface 207 and the timing means 208, i.e. the start of a data string. This is detected at step S1. Then, the data length setting means 201 is triggered to transfer the predetermined length to the register 401 and this is shown at step S2. Then, the number of data bits or bytes received is counted at step S3 and at step S4 this is compared with the predetermined values derived at step S2. Provided these values are different, processing returns to step 3. If, however, they are the same, a signal is generated on line 203 to the processor, at step S5. Of course, if, at step S1, it is determined that the data is not being input to the serial interface 207, then processing ends immediately after step S1.

The above description of the timing means 208 of the intelligent input/output device 72 has assumed that the structure of FIG. 6 is achieved by a hardware arrangement. This is most efficient because the hardware may then be arranged to process the data strings rapidly. As an alternative, however, the arrangement of FIG. 6 could be considered solely as a logical structure defined by a program in the processor 202. In a similar way, although the data setting means 210 which sets the predetermined length of the data string is illustrated as a separate component, again this could be a logical component within the processor 202.

Figure 8:
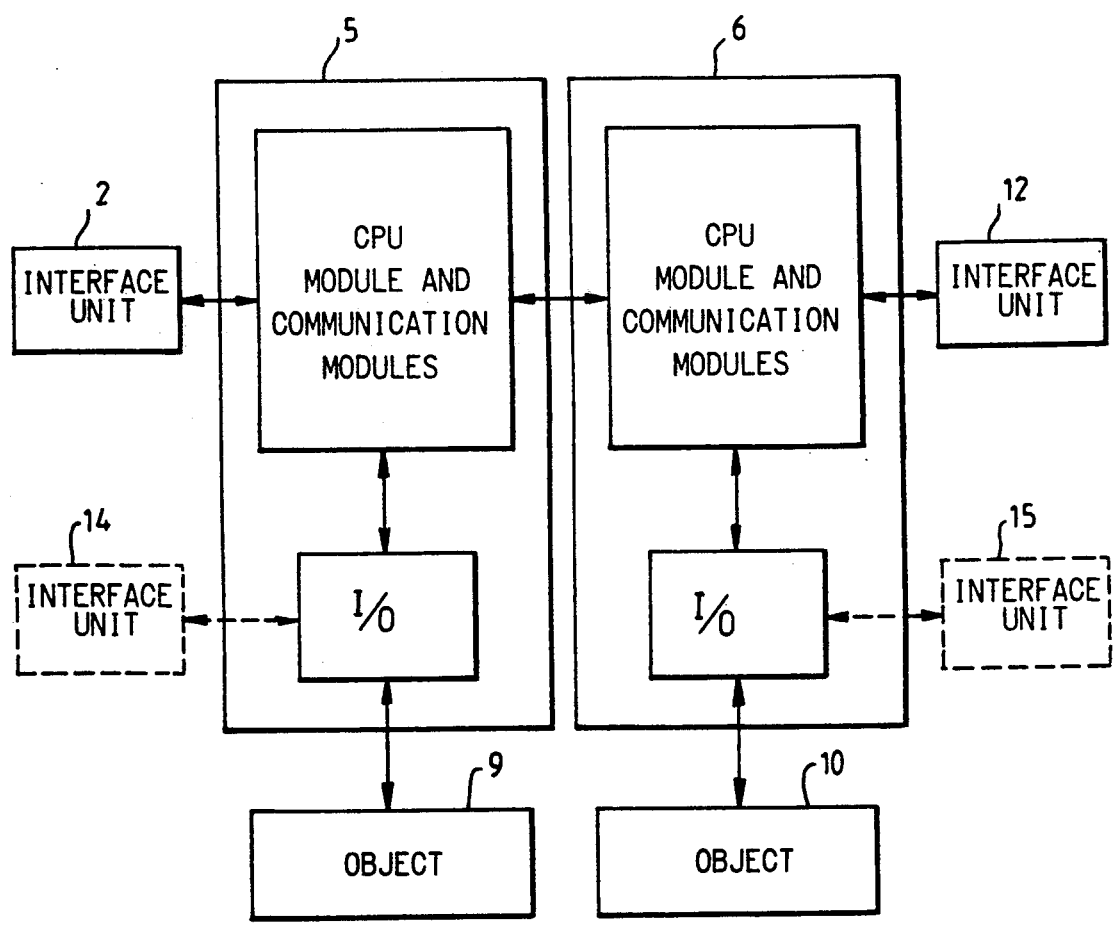
FIG. 8 shows the interconnection of two programmable controllers incorporating the present invention.

In FIG. 1, it was mentioned that a programmable controller 5 according to the present invention could be connected to an external unit 6. FIG. 8 shows one configuration, in which a programmable controller 5, corresponding to the programmable controller in FIG. 1, is connected to a further programmable controller 6. The internal structure of that additional programmable controller 6 may be generally the same as the programmable controller 5, and may contain a CPU module, communications modules, and input/output devices as before. The programmable controller 6 is connected to an object 10 to be controlled, and also to an interface unit 12 which performs the same function as the interface unit 2 in FIG. 1. In a similar way, the intelligent input/output device of the programmable controller 6 may be connected to an interface unit 15, corresponding to the interface unit 14 in FIG. 1. As can be imagined, this arrangement could be extended to further programmable controllers.

Thus, a predetermined data string length is defined, and the data string can be processed differently depending on whether it is less than or greater than a predetermined length (the case where it is the same as a predetermined length is trivial, and, as a matter of convention in this text, the predetermined length may be exactly one bit longer than the maximum length of a data string which needs to be processed rapidly). Immediately on receipt of the data string, the processing by the processor of the input/output device is halted, and the processor may then begin to process the new data string. If, however, the data string exceeds the predetermined length, then the processor returns to its original processing, and the rest of the data string is stored. In this way, it is possible for the processor to process rapidly data strings which are short, and to defer processing of longer data strings, without the need for control data to be contained within the data string. Therefore, there is no delay in processing very short data strings, and thus a more efficient system may be achieved.

What is claimed is:

1. An input/output device comprising:
   input means for receiving sequentially a plurality of data strings;
   a processor for processing said plurality of data strings received by said input means;
   interrupt means responsive to said input means for interrupting said processor in the processing of a previously received data string on receipt by said input means of a currently received data string;
   determination means connected to said processor for determining the length of each data string relative to a predetermined length; and
   means for releasing the interrupt of said processor when the length of said currently received data string, as determined by said determination means, is at least equal to said predetermined length, and to cause said processor immediately to process said currently received data string when the length of said currently received data string, as determined by said determination means, is less than said predetermined length.

2. An input/output device according to claim 1, further comprising:
   a memory associated with said processor; and
   transmitting means for transmitting to said memory, at least a part of said currently received data string when the length of said currently received data string is at least equal to said predetermined length.

3. An input/output device according to claim 2, wherein when the length of said currently received data string is greater than said predetermined length, said processor thereafter processes the part of said currently received data string with a length less than said predetermined length and said transmitting means transmits the remainder of said currently received data string to said memory.

4. An input/output device according to claim 2, further including means for retrieving from said memory at least a part of a data string from said memory by said processor and for transmitting said part of said data string to said processor for processing.

5. An input/output device according to claim 1, wherein said determination means further includes an user controllable means operable with a storage area for setting said predetermined length, means for storing said predetermined length in said storage area, and means operable with said processor for measuring the length of each of said plurality of data strings and for comparing the length of each of said plurality of data strings with said predetermined length.

6. An input/output device comprising:
   input means for receiving sequentially a plurality of data strings;

a processor for processing said plurality of data strings received by said input means;

a memory for storing at least part of a data string;

determination means for determining a length of each of said plurality of data strings relative to a predetermined length; and means, connected to said input means, for transmitting one of said plurality of data strings to said processor for processing by said processor when the length of said one of said plurality of data strings, as determined by said determination means, is less than said predetermined length, and for transmitting to said memory at least a part of said one of said plurality of data strings when the length of said one of said plurality of data strings, as determined by said determination means, is at least equal to said predetermined length.

7. An input/output device according to claim 6, whereby said determination means further includes an user controllable means connected to a storage area for setting a predetermined length therein for said plurality of data strings, means for storing said predetermined length in said storage area, means for measuring the length of each of said plurality of data strings received by said input means, and means connected to said input means for comparing the length of each of said plurality of data strings with said predetermined length.

8. A method of processing a plurality of data strings, the method comprising the steps of:

receiving in a sequence a plurality of data strings; and processing said plurality of data strings by a processor;

wherein, for any one of said plurality of data strings, the method includes:

interrupting the processing by said processor of a previously received data string;

determining the length of each of said plurality of data strings relative to a predetermined length;

releasing said interrupt of said processor when the length of said one of said plurality of data strings is at least equal to said predetermined length; and causing said processor immediately, to process a currently received data string when the length of said currently received data string is less than said predetermined length.

9. A method according to claim 8, the method further including the steps of storing a part of said currently received data string in a memory when said currently received data string has a length of at least equal to said predetermined length.

10. A method according to claim 9, wherein, when the length of said currently received data string is greater than said predetermined length, the part of said currently received data string less than said predetermined length is processed by said processor while the remainder of said currently received data string is stored in said memory.

11. A method according to claim 9, including retrieving said part of said currently received data string stored in said memory and processing that retrieved part.

12. A method according to claim 8, the method further including the step of presetting said predetermined length and storing that predetermined length.

13. A method of processing a plurality of data strings, the method comprising the steps of:

receiving in a sequence a plurality of data strings; and processing by a processor said plurality of data strings received by an input means;

wherein, for any one of said plurality of data strings, the method includes:

determining the length of each of said plurality of data strings relative to a predetermined length;

processing said currently received data string by said processor when said currently received data string has a length less than said predetermined length; and storing a part of said currently received data string in a memory when said currently received data string has a length of at least equal to said predetermined length.

14. A method according to claim 13, the method further including the step of presetting said predetermined length and storing that predetermined length.

15. A device for controlling the processing of a sequence of data strings by a processor, the device comprising:

user controllable means connected to a storage area for setting a predetermined length for a plurality of data strings;

means for storing said predetermined length in said storage area;

means for measuring the length of each of said plurality of data strings received by an input means and means connected to a processor for comparing the length of each of said plurality of data strings with said predetermined length; and means connected to said processor for controlling said processor such that said processor postpones processing of at least a part of one of said plurality of data strings when the length of said one of said plurality of data strings is at least equal to said predetermined length and controlling said processor such that said processor immediately processes said one of said plurality of data strings when the length of said one of said plurality of data strings is less than said predetermined length.

16. A control system, comprising:

an object connected to an input/output device for generating information data relating to characteristics of said object; and processing means connected to said input/output device for processing said information data;

wherein:

said object is connected to said input/output device to allow transmission of said information data to said processing means in a sequence of frames, a first part of each frame containing only said information data; and said processing means processes said information data on the basis of the length of said frame relative to a predetermined frame length, wherein when the length of said frame is at least equal to said predetermined frame length, said processing means postpones processing of at least a part of said frame and when the length of said frame is less than said predetermined frame length, said processing means immediately processes said frame.

17. A control system, comprising:

an object connected to an input/output device for generating information data relating to characteristics of said object; and processing means connected to said input/output device for processing said information data;

wherein:

said object is connected to said input/output device to allow transmission of said information data to said processing means in a sequence of frames, a first part of each frame contains only said information data and dummy data; and said processing means processes said information data on the basis of the length of said frame relative to a predetermined frame length, wherein when the length of said frame is at least equal to said predetermined frame length, said processing means postpones processing of at least a part of said frame and when the length of said frame is less than said predetermined frame length, said processing means immediately processes said frame.

18. A control system, comprising:

an object connected to an input/output device for generating information data relating to characteristics of said object; and processing means connected to said input/output device for processing said information data; wherein:

said object is connected to said input/output device to allow transmission of said information data to said processing means in a sequence of frames, a first part of each said frame being free of data relating to the length of said frame;

said processing means processes said information data on the basis of the length of said frame relative to a predetermined frame length, wherein when the length of said frame is at least equal to said predetermined frame length, said processing means postpones processing of at least a part of said frame and when the length of said frame is less than said predetermined frame length, said processing means immediately processes said frame.

19. A control system comprising:

an object connected to an input/output device for generating information data relating to characteristics of said object; and a processing means connected to said input/output device for processing said information data, said processing means including:

input means for receiving sequentially a plurality of data strings containing said information data;

a processor for processing said plurality of data strings received from said input means;

interrupt means for interrupting said processor on receipt by said input of one of said plurality of data strings; and determination means for determining the length of each of said plurality of data strings relative to a predetermined length;

said determination means for releasing the interrupt of said processor when the length of said one of said plurality of data strings, as determined by said determination means, is at least equal to said predetermined length, and to cause said processor immediately to start processing said one of said plurality of data strings when the length of said one of said plurality of data strings, as determined by said determination means is less than said predetermined length.

20. A control system, comprising:

an object capable of generating information data relating to characteristics of said object, said object connected to an input/output device; and a processing means for processing said information data, said processing means including:

input means for receiving sequentially a plurality of data strings containing said information data;

a processor for processing said plurality of data strings received from said input means;

a memory for storing at least part of a data string;

determination means for determining the length of each of said plurality of data strings relative to a predetermined length; and means for transmitting one of said plurality of data strings to said processing means for immediate processing by said processing means when the length of said one of said plurality of data strings, as determined by said determination means, is less than said predetermined length and for transmitting at least a part of said one of said plurality of data strings to said memory for processing at a later time by said processing means when the length of said one of said plurality of data strings, as determined by said determination means, is at least equal to said predetermined length.

21. A control system, comprising:

an object connected to an input/output device for generating information data relating to characteristics of said object; and a processing means connected to said input/output device for processing said information data, said processing means including:

a plurality of input/output devices, at least some of said input/output devices comprising:

input means for receiving sequentially a plurality of data strings containing said information data;

a processor for processing said plurality of data strings received by said input means;

interrupt means, responsive to said input means for interrupting said processor in the processing of a previously received data string on receipt by said input means of a currently received data string;

determination means connected to said processor for determining the length of each of said plurality of data strings relative to a predetermined length;

means for releasing the interrupt of said processor when the length of said currently received data string, as determined by said determination means, is at least equal to said predetermined length, and to cause said processor immediately to process said currently received data string when the length of said currently received data string, as determined by said determination means, is less than said predetermined length.

22. A control system according to claim 21, wherein said processing means further includes a processing module for further processing of said information data subsequent to said processing by said processor.

23. A control system, comprising:

a processing module for generating information data relating to control parameters for an object; and a processor for processing said information data; wherein:

said processing module transmits said information data to said processor in a sequence of frames, a first part of each frame containing only said information data; and said processor processes said information data on the basis of the length of said frame relative to a predetermined frame length, wherein when the length of said frame is at least equal to said predetermined frame length, said processing means postpones processing of at least a part of said frame and when the length of said frame is less than said predetermined frame length, said processing means immediately processes said frame.

24. A control system, comprising:
a processing module for generating information data relating to control parameters for an object; and
a processor for processing said information data; wherein:
said processing module transmits said information data to said processor in a sequence of frames, a first part of each frame contains only said information data and dummy data; and
said processor processes said information data on the basis of the length of said frame relative to a predetermined frame length, wherein when the length of said frame is at least equal to said predetermined frame length, said processing means postpones processing of at least a part of said frame and when the length of said frame is less than said predetermined frame length, said processing means immediately processes said frame.

25. A control system, comprising:
a processing module for generating information data relating to control parameters of an object; and
a processor for processing said information data; wherein:
said processing module transmits said information data to said processor in a sequence of frames, a first part of each said frame being free of data relating to the length of said frame; and
said processor processes said information data on the basis of the length of said frame relative to a predetermined frame length, wherein when the length of said frame is at least equal to said predetermined frame length, said processing means postpones processing of at least a part of said frame and when the length of said frame is less than said predetermined frame length, said processing means immediately processes said frame.

26. A control system, comprising:
a processing module arranged to generate information data relating to control parameters of an object; and
a processing means for processing said information data, said processing means including:
input means for receiving sequentially a plurality of data strings containing said information data;
a processor for processing said plurality of data strings received by said input means;
interrupt means responsive to said input means for interrupting said processor in the processing of a previously received data string on receipt by said input means of a currently received data string;
determination means connected to said processor for determining the length of each data string relative to a predetermined length; and
means for releasing the interrupt of said processor when the length of said currently received data string, as determined by said determination means, is at least equal to said predetermined length, and to cause said processor immediately to process said currently received data string when the length of said currently received data string, as determined by said determination means, is less than said predetermined length.

27. A control system, comprising:
a processor arranged to generate information data relating to control parameters of an object; and
a processing means for processing said information data, said processing means including:
input means for receiving sequentially a plurality of data strings containing said information data;
a processor for processing said plurality of data strings received from said input means;
a memory for string at least part of a data string;
determination means connected to said processor for determining the length of each of said plurality of data strings relative to a predetermined length; and
transmitting means for transmitting one of said plurality of data strings to said processing means for immediate processing by said processing means when the length of said one of said plurality of data strings, as determined by said determination means, is less than said predetermined length and for transmitting to said memory at least a part of said any one of said data strings for processing at a later time by said processing means when the length of said any one of said data strings, as determined by said determination means, is at least equal to said predetermined length.

28. A control system, comprising:
an object to be controlled; and
a processing means for generating and transmitting information data for control of said object, said processing means including:
a processing module for generating said information data; and
a plurality of input/output devices for transmitting said information data to said object, at least one of said input/output devices comprising:
input means for receiving sequentially a plurality of data strings containing said information data from said processing module;
a processor for processing said plurality of data strings received by said input means;
interrupt means responsive to said input means for interrupting said processor in the processing of a previously received data string on receipt by said input means of a currently received data string;
determination means connected to said processor for determining the length of each of said plurality of data strings relative to a predetermined length; and
means for releasing the interrupt of said processor when the length of said currently received data string, as determined by said determination means, is at least equal to said predetermined length, and to cause said processor immediately to process said currently received data string when the length of said currently received data string, as determined by said determination means, is less than said predetermined length.

29. A control system, comprising:
an object to be controlled, said object capable of generating first information data relating to characteristics of said object; and
a processing means for processing said first information data and for producing second information data for control of said object;
said processing means having:
a processing module for processing said first information data and for generating said second information data;
a first plurality of input/output devices for transmitting said first information data from said object to said processing module, said first plurality of input/output devices each having an input means for receiving a plurality of data strings containing said first information data; and a second plurality of input/output devices for transmitting said second information data from said processing module to said object, said second plurality of input/output devices each having an input means for receiving a plurality of data strings containing said second information data;

wherein at least one of said first and second input/output devices further includes:

a processor for processing said plurality of data strings;

interrupt means for interrupting said processor on receipt by said input means of any one of said data strings; and determination means for determining the length of each data string relative to a predetermined length;

means for releasing the interrupt of said processor when the length of said any one of said data strings, as determined by said determination means, is at least equal to said predetermined length, and to cause said processor immediately to process said any one of said data strings when the length of said any one of said data strings, as determined by said determination means is less than said predetermined length.

30. A data processing system for processing a plurality of data strings comprising:

means for receiving in a sequence a plurality of data strings and processing said plurality of data strings;

means for interrupting the processing by said processing means of a previously received data string in response to receipt of a currently received data string;

means for determining the length of each of said plurality of data strings relative to a predetermined length;

means for releasing said interrupt of said processing means when the length of said currently received data string is at least equal to said predetermined length; and means for causing said processing means immediately to process said currently received data string when the length of said currently received data string is less than said predetermined length.

31. A method of processing a plurality of strings, comprising the steps of:

receiving in a sequence a plurality of data strings;

processing the plurality of data strings by a processor;

interrupting the processing of a previously received data string by the processor in response to receipt of a currently received data string if a predetermined length of the previously received data string has been processed;

carrying out immediately the processing of said currently received data string when said interrupting step is performed;

releasing the interrupt of the processor when the length of said currently received data string being processed reaches said predetermined length and causing said processor to process the rest of said previously received data string.

32. A method of processing a plurality of strings according to claim 31 wherein said releasing step includes the step of:

releasing either when a length of said currently received data string having a length greater than said predetermined length has been processed or when the complete length of said currently received data string having a length smaller than said predetermined length has been processed and causing said processor to process the rest of said previously received data string.

* * * * *